(12) United States Patent
Ishii

(10) Patent No.: US 12,359,848 B2
(45) Date of Patent: Jul. 15, 2025

(54) VAPOR SUPPLY DEVICE AND DRYING SYSTEM

(71) Applicant: IHI Corporation, Tokyo (JP)

(72) Inventor: Toru Ishii, Tokyo (JP)

(73) Assignee: IHI Corporation, Tokyo (JP)

( * ) Notice: Subject to any disclaimer, the term of this patent is extended or adjusted under 35 U.S.C. 154(b) by 623 days.

(21) Appl. No.: 17/394,986

(22) Filed: Aug. 5, 2021

(65) Prior Publication Data

US 2021/0364193 A1 Nov. 25, 2021

Related U.S. Application Data

(63) Continuation of application No. PCT/JP2020/004941, filed on Feb. 7, 2020.

(30) Foreign Application Priority Data

Feb. 14, 2019 (JP) .................................. 2019-024650

(51) Int. Cl.
*F24S 10/95* (2018.01)
*F22B 3/00* (2006.01)
(Continued)

(52) U.S. Cl.
CPC ................ *F24S 10/95* (2018.05); *F22B 3/00* (2013.01); *F24S 23/74* (2018.05); *F22B 5/00* (2013.01);
(Continued)

(58) Field of Classification Search
CPC .. F24S 10/95; F24S 23/74; F24S 60/10; F24S 90/00; F22B 3/00; F22B 5/00; F22B 33/18; F26B 3/084; Y02E 10/44
(Continued)

(56) References Cited

U.S. PATENT DOCUMENTS

| | | | | |
|---|---|---|---|---|
| 4,154,292 A | * | 5/1979 | Herrick | F28D 11/02 |
| | | | | 165/104.11 |
| 4,180,124 A | * | 12/1979 | Shurcliff | F28D 20/02 |
| | | | | 126/400 |
| 10,072,530 B2 | * | 9/2018 | Chen | F03G 7/00 |

FOREIGN PATENT DOCUMENTS

AU 2015351701 B2 6/2016
CN 207830046 U * 9/2018
(Continued)

OTHER PUBLICATIONS

Patent: JP-2016095114-A, Sumitomo Heavy Industries Ltd, "Solar heat light collection device and solar heat light collection system" (Year: 2014).*

(Continued)

*Primary Examiner* — Steven B McAllister
*Assistant Examiner* — Benjamin W Johnson
(74) *Attorney, Agent, or Firm* — Oblon, McClelland, Maier & Neustadt, L.L.P.

(57) ABSTRACT

A vapor supply device includes a sunlight-condensing heat collection unit which condenses sunlight and collects heat to obtain thermal energy, a heat-storage and heat-exchange unit which heats a heat-storage agent stored therein using the thermal energy obtained in the sunlight-condensing heat collection unit and stores thermal energy in the heat-storage agent, and heats a supply medium using the thermal energy stored in the heat-storage agent, and a vapor supply unit which supplies a vapor of the supply medium obtained by heating the supply medium in the heat-storage and heat-exchange unit.

8 Claims, 6 Drawing Sheets

(51) Int. Cl.
 *F24S 23/74* (2018.01)
 *F22B 5/00* (2006.01)
 *F22B 33/18* (2006.01)
 *F24S 60/10* (2018.01)
 *F24S 90/00* (2018.01)
 *F26B 3/084* (2006.01)

(52) U.S. Cl.
 CPC .............. *F22B 33/18* (2013.01); *F24S 60/10* (2018.05); *F24S 90/00* (2018.05); *F26B 3/084* (2013.01); *Y02E 10/44* (2013.01)

(58) Field of Classification Search
 USPC ........................................................ 126/635
 See application file for complete search history.

(56) References Cited

FOREIGN PATENT DOCUMENTS

| | | |
|---|---|---|
| DE | 10 2012 024 526 A1 | 6/2014 |
| EP | 2 574 784 A2 | 4/2013 |
| EP | 2 949 722 A1 | 12/2015 |
| EP | 3 130 770 A1 | 2/2017 |
| JP | 2007-132330 A | 5/2007 |
| JP | 2012-127574 A | 7/2012 |
| JP | 2012-189008 A | 10/2012 |
| JP | 2013178026 A * | 9/2013 |
| JP | 2014138522 A * | 7/2014 |
| JP | 2016-95114 A | 5/2016 |
| JP | 2016-99099 A | 5/2016 |
| JP | 2016095114 A * | 5/2016 |
| JP | 2017-520722 A | 7/2017 |
| KR | 20160041864 A * | 4/2016 |
| KR | 102310129 B1 * | 10/2021 |
| WO | WO-2007074570 A1 * | 7/2007 ............. F01K 23/10 |
| WO | WO 2010/083285 A1 | 7/2010 |
| WO | WO 2014/114220 A1 | 7/2014 |
| WO | WO 2016/164341 A1 | 10/2016 |
| WO | WO 2017/057260 A1 | 4/2017 |
| WO | WO-2020166526 A1 * | 8/2020 ............... F22B 3/00 |

OTHER PUBLICATIONS

KR 20160041864 A—Translation (Year: 2016).*
JP 2016095114 A—Translation (Year: 2016).*
CN 207830046 U—Translation (Year: 2018).*

* cited by examiner

VAPOR SUPPLY DEVICE AND DRYING SYSTEM

CROSS-REFERENCE TO RELATED APPLICATIONS

This application is a Continuation Application based on International Application No. PCT/JP2020/004941, filed Feb. 7, 2020, which claims priority on Japanese Patent Application No. 2019-024650, filed Feb. 14, 2019, the contents of which are incorporated herein by reference.

TECHNICAL FIELD

The present disclosure relates to a vapor supply device and a drying system.

BACKGROUND

In recent years, uses of renewable energy have expanded in order to suppress emissions of carbon dioxide and nitrogen oxides, and the use of sunlight as a heat source has attracted attention as one of the uses of renewable energy. For example, Patent Document 1 discloses a drying system which generates vapor using thermal energy obtained by condensing sunlight as a heat source and dries a high-humidity solid fuel using the generated vapor.

DOCUMENT OF RELATED ART

Patent Document

[Patent Document 1] Japanese Unexamined Patent Application, First Publication No. 2016-099099

SUMMARY

In the vapor supply system described in Patent Document 1, vapor is directly generated by the thermal energy obtained by condensing sunlight. However, the time that the amount of heat sufficient for vapor generation can be obtained from sunlight is limited, and depending on the weather, the amount of heat may be insufficient throughout the day. Therefore, in the vapor supply system described above, it is difficult to stably supply vapor.

The present disclosure has been made in view of the above circumstances, and an object thereof is to stably supply vapor in a vapor supply device which condenses sunlight and uses the condensed sunlight as a heat source.

An aspect of the present disclosure is a vapor supply device including a sunlight-condensing heat collection unit which condenses sunlight and collects heat to obtain thermal energy, a heat-storage and heat-exchange unit which heats a heat-storage agent stored therein using the thermal energy obtained in the sunlight-condensing heat collection unit and stores thermal energy in the heat-storage agent, and heats a supply medium using the thermal energy stored in the heat-storage agent, and a vapor supply unit which supplies a vapor of the supply medium obtained by heating the supply medium in the heat-storage and heat-exchange unit.

In the vapor supply device of the aspect, the sunlight-condensing heat collection unit may heat a heat medium using thermal energy obtained by condensing sunlight, and the heat-storage and heat-exchange unit may heat the heat-storage agent by the heat medium which has been heated using the thermal energy.

In the vapor supply device of the aspect, the sunlight-condensing heat collection unit may include a plurality of sunlight-condensing heat collection units, the heat-storage and heat-exchange unit may include a plurality of heat-storage and heat-exchange units, each of the plurality of heat-storage and heat-exchange units may heat a heat-storage agent stored therein using the thermal energy obtained in the corresponding sunlight-condensing heat collection unit and stores thermal energy in the heat-storage agent, and heat the supply medium using the thermal energy stored in the heat-storage agent, and the vapor supply unit may supply vapors of the supply medium, which are respectively obtained by heating the supply medium in the plurality of heat-storage and heat-exchange units, under different conditions.

In the vapor supply device of the aspect, by heating a portion of a first vapor of the supply medium, which is obtained by heating the supply medium in a first heat-storage and heat-exchange unit of the plurality of heat-storage and heat-exchange units, in a second heat-storage and heat-exchange unit of the plurality of heat-storage and heat-exchange units, a superheated vapor of the supply medium which has a temperature higher than that of the first vapor may be obtained.

In the vapor supply device of the aspect, the vapor supply device may further include an auxiliary boiler which heats the supply medium.

In the vapor supply device of the aspect, the heat-storage and heat-exchange unit may include a stirring device which stirs the heat-storage agent.

In the vapor supply device of the aspect, the vapor of the supply medium may be continuously supplied by heating the supply medium using the thermal energy stored in the heat-storage agent even in a time zone in which thermal energy from sunlight is not obtained.

Another aspect of the present disclosure is a drying system including the vapor supply device, and a fluidized bed-drying device which uses the vapor of the supply medium supplied from the vapor supply device as a heat source to dry a high-humidity raw material while flowing the high-humidity raw material.

Another aspect of the present disclosure is a drying system including the vapor supply device, and a fluidized bed-drying device which uses the vapor of the supply medium supplied from the vapor supply device as a heat source and dries a high-humidity raw material using the superheated vapor while flowing the high-humidity raw material.

According to the present disclosure, the vapor supply device stores thermal energy obtained by condensing sunlight to collect heat in the heat-storage agent, and generates vapor by heating the supply medium using the heat-storage agent. Accordingly, it is possible to generate vapor by the thermal energy stored in the heat-storage agent even in a time zone in which the supply of the thermal energy obtained by condensing sunlight to collect heat is insufficient, such as at night or when the weather is bad. Further, as the fluctuation in the amount of collected heat due to the change in sunlight with time passage is leveled by temporarily storing the thermal energy in the heat-storage agent, the supply medium can always be heated under a constant condition, and as a result, the vapor can be stably supplied.

DESCRIPTION OF EMBODIMENTS

First Embodiment

Hereinafter, a first embodiment of a vapor supply device according to the present disclosure will be described with reference to the drawings.

Figure 1:
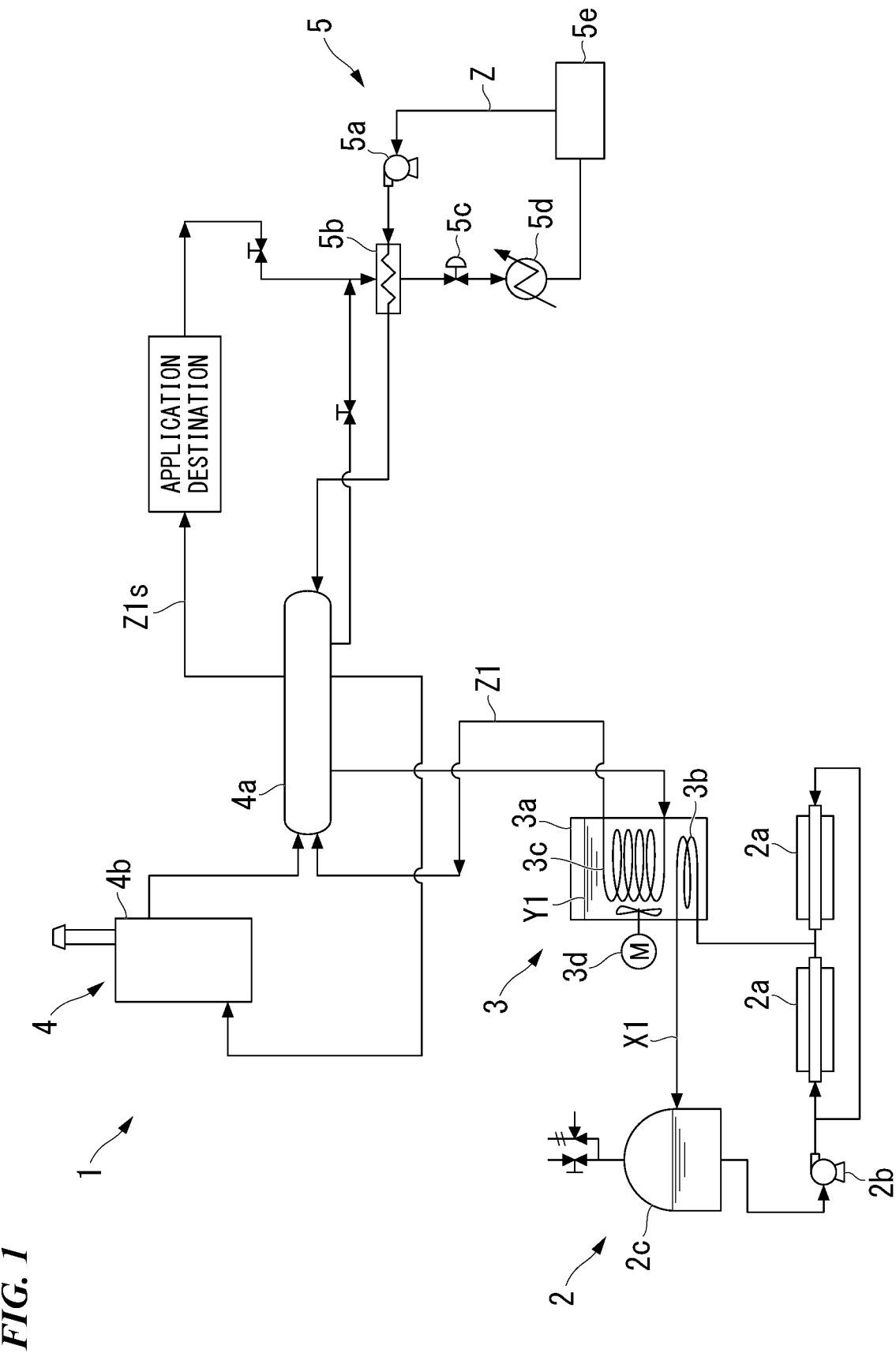
FIG. 1 is a schematic diagram illustrating a configuration of a vapor supply device according to a first embodiment of the present disclosure.

A vapor supply device 1 according to the present embodiment heats a supply medium Z1 and supplies the heated supply medium Z1 to an application destination (supply destination). For example, the supply medium Z1 is a fluid which is pressurized with respect to the atmospheric pressure, and when the supply medium Z1 is heated, a portion of the supply medium Z1 becomes vapor. The vapor is separated from the heated supply medium Z1 and supplied to the application destination as a vapor medium Z1s. As illustrated in FIG. 1, the vapor supply device 1 includes a sunlight-condensing heat collection unit 2, a heat-storage and heat-exchange unit 3, a vapor supply unit 4, and a medium circulation unit 5.

Before the first embodiment is described in detail, a mechanism for storing thermal energy in a heat-storage agent will be described.

Figure 2:
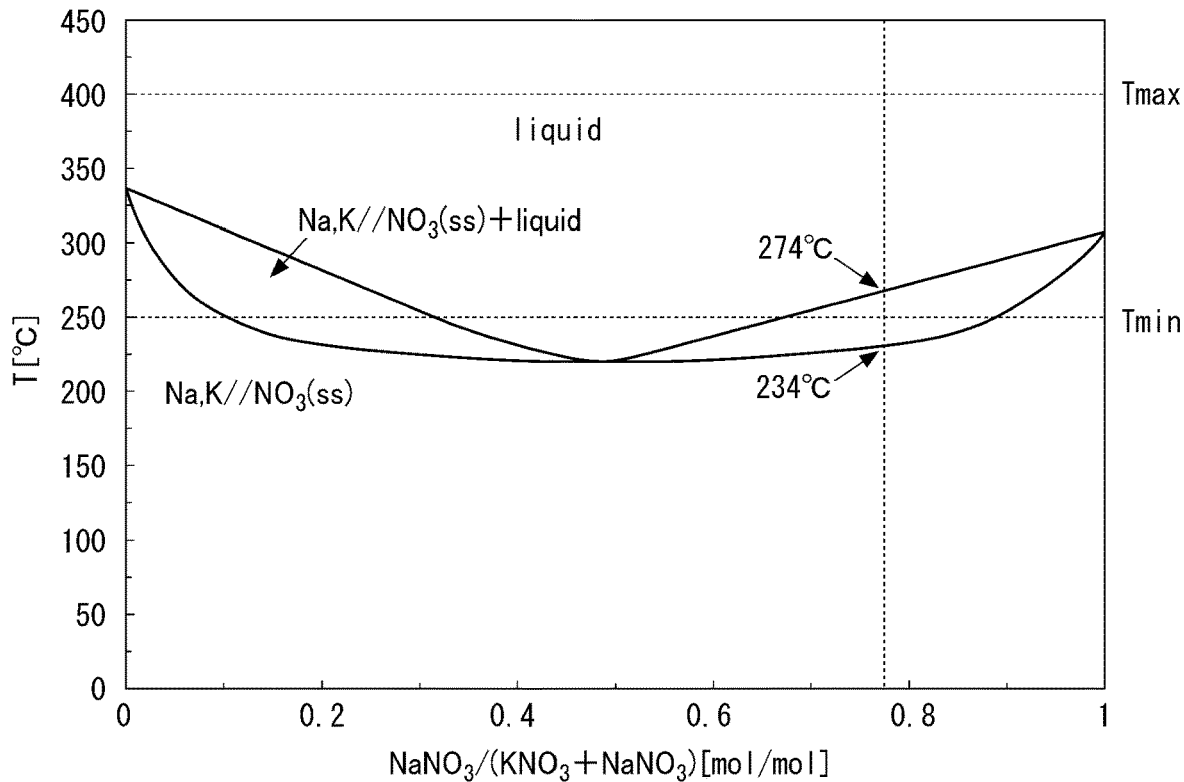
FIG. 2 is a phase change characteristic diagram with respect to a composition and a temperature of a heat-storage agent used in the present disclosure.

For example, the heat-storage agent is a mixture containing nitrate of an alkali metal element, such as sodium nitrate ($NaNO_3$) or the like, and is a mixed salt which has a temperature range in which a solid-liquid phase change occurs in a range of 150° C. to 400° C. Further, the thermal energy stored in the heat-storage agent includes latent heat corresponding to the phase change between a solid and a liquid, and sensible heat corresponding to a temperature change of the heat-storage agent. An example of the temperature characteristics of the heat-storage agent is illustrated in FIG. 2, in which a region where the entire heat-storage agent is present in the liquid phase, a region where the liquid phase and the solid phase coexist, and a region where the entire heat-storage agent is present in the solid phase exist. In order to smoothly perform the repetition between heat storage and heat dissipation of the heat-storage agent, the temperature range is selected in which the fluidity of the heat-storage agent can be secured to some extent and the amount of heat-storage can be gained, and the composition of the heat-storage agent suitable for the selected temperature range is selected.

The example shown in FIG. 2 is a system in which a mixed salt of sodium nitrate ($NaNO_3$) and potassium nitrate ($KNO_3$) is used as a heat-storage agent, and a curve in FIG. 2 illustrates that the temperature range in which the phase change occurs changes with respect to a mixing ratio shown in a horizontal axis. In FIG. 2, as a range which satisfies the conditions suitable for the heat-storage agent, a composition in which a molar fraction of sodium nitrate ($NaNO_3$) is 0.786 is selected, and in this composition, a temperature range to be used is selected in consideration of the phase change when the temperature of the heat-storage agent is changed. In order to store as much thermal energy as possible in the heat-storage agent to secure a stable vapor supply, an upper limit (Tmax) of a temperature to be used is in a region where the entire heat-storage agent is present in the liquid phase, and a lower limit (Tmin) of the temperature to be used is in a region where although the heat-storage agent partially becomes a solid phase, the heat-storage agent is a slurry state due to the presence of a certain amount of liquid phase and a certain degree of fluidity is maintained. As a proportion of the solid phase in the heat-storage agent increases, the viscosity increases and the fluidity is lost. Therefore, the composition of the heat-storage agent and the temperature range to be used is selected within a range which does not interfere with the transfer of thermal energy.

The specific operation will be described by limiting the composition of the mixed salt and the temperature range to be used. A broken line in FIG. 2 indicate a mixed salt having a molar fraction of sodium nitrate of 0.786, where Tmax is 400° C. and Tmin is 250° C. In this condition, the entire heat-storage agent is present in the liquid phase. When the temperature of the heat-storage agent gradually decreases from this point and reaches 274° C., some of the components of the heat-storage agent changes to the solid phase, and the solid phase and the liquid phase coexist in the heat-storage agent. As the temperature of the heat-storage agent further decreases, the proportion of the solid phase in the heat-storage agent increases. When the temperature of the heat-storage agent reaches 234° C., the heat-storage agent is completely in the solid phase. When the heat-storage agent is completely in the solid phase, the fluidity is lost and heat transfer becomes difficult, which is not preferable. In order to reliably store heat and dissipate heat, Tmin is a temperature which allows some margin for the temperature at which the fluidity of the heat-storage agent is completely lost.

In actual operation, the composition of the heat-storage agent and the temperature range to be used are selected in consideration of the conditions of heat-exchange with the supply medium, and are not limited to the composition of the mixed salt, the upper limit temperature and the lower limit temperature described above.

Further, in the example shown in FIG. 2, from Tmax to 274° C. at which the phase change starts, only the heat stored as sensible heat in the heat-storage agent is used. Accordingly, the temperature largely decreases as the heat dissipation progresses. Meanwhile, from 274° C. to Tmin, the latent heat associated with the phase change of the heat-storage agent is mainly used. Since in this region, a temperature change is small even when the heat dissipation progresses, the latent heat having such characteristics may be used when the supply medium is heated to generate vapor. When the vapor is further heated to generate superheated vapor, a high temperature is required but a large amount of heat is not required, and therefore a temperature region close to Tmax may be used. Tmax and Tmin may be selected in consideration of the characteristics of the heat-storage agent. Hereinafter, the temperature range between Tmax and Tmin is referred to as an "operating range of the heat-storage agent" or simply an "operating range".

Next, the configuration and operation of a sunlight-condensing device in the sunlight-condensing heat collection unit 2 which condenses sunlight and heats a heat medium will be described.

When sunlight is condensed by a lens or the like, a surface of an object placed near a focal point of the condensed light becomes hot, and for example, when the object is paper, the paper ignites. Similar to the lens, when a concave mirror is used, a large amount of thermal energy can be obtained near the focal point. A device which condenses the sunlight and heats an object to be heated is an application of the above phenomenon, and by reflecting the sunlight and placing the object to be heated near the focal point of the reflected light, the object to be heated can be heated to a high temperature in a shorter time compared to a heater which simply exposes the object to be heated to the sunlight.

Various sunlight-condensing devices have been proposed. As a shape suitable for continuously heating a fluid, a sunlight-condensing device is proposed in which the object to be heated is guided in a straight pipe (heat transfer tube) and the heat transfer tube is heated with the condensed sunlight. Specifically, a reflecting mirror is made semi-cylindrical, and the sunlight is reflected on a concave surface side of the semi-cylindrical reflecting mirror. The heat transfer tube is disposed parallel to the reflecting mirror so that the reflected light is focused in a straight line near the heat transfer tube. An actual curved surface shape is a shape close to an ellipse, and the curved surface shape is formed so that the reflected light is collected in a substantially straight line.

The object to be heated is heated while passing through the heat transfer tube. Considering the time required for heating, in general, the heat transfer tube needs to have a certain length, and the reflecting mirror has a horizontally long shape parallel to the heat transfer tube. An example of the sunlight-condensing device will be illustrated below, and a specific configuration and operation thereof will be described below, but the sunlight-condensing device which is actually manufactured is not limited to the example illustrated below.

Figure 3A:
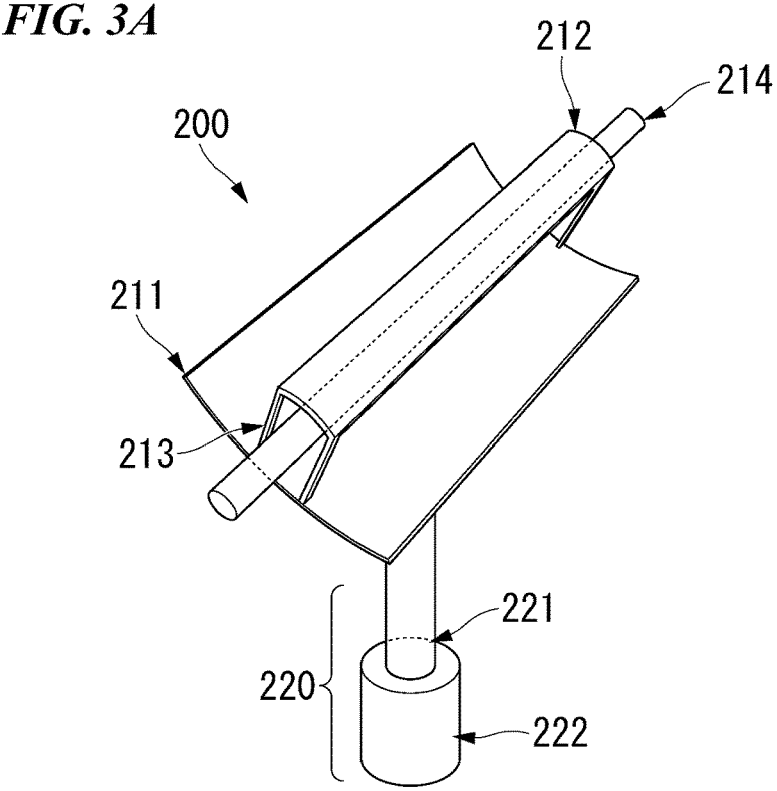
FIG. 3A is a perspective view of a sunlight-condensing device used in the present disclosure.
Figure 3B:
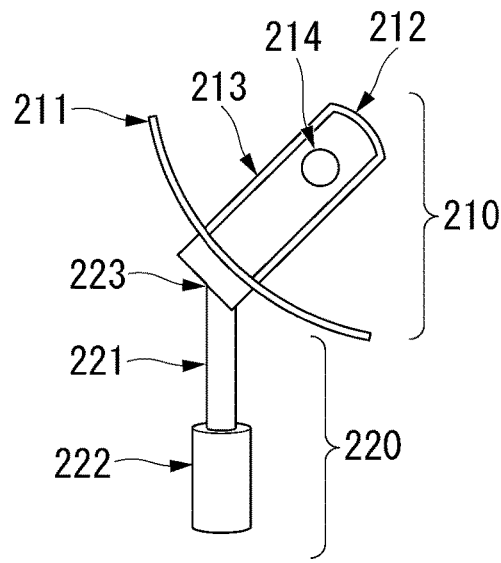
FIG. 3B is a cross-sectional view of the sunlight-condensing device used in the present disclosure.

FIGS. 3A and 3B illustrate a device 200 (in the following description, the term "sunlight-condensing device" will be used) used to condense the sunlight and heat a heat medium flowing through a pipe by the condensed sunlight.

The sunlight-condensing device 200 mainly includes a light-condensing heating unit 210 and a support device 220. The light-condensing heating unit 210 includes a sunlight-condensing portion which includes a main light-condensing mirror 211, a sub light-condensing mirror 212, and a connection bracket 213, and a medium-heating tube 214 which is provided on a straight line at which the condensed light is collected. The support device 220 not only supports the light-condensing heating unit 210, but also adjusts an azimuth angle (horizontal angle) and an elevation angle (vertical angle) of the light-condensing heating unit 210 so that sunlight can be reflected and condensed as much as possible.

The configuration and function of the light-condensing heating unit 210 will be described.

The main light-condensing mirror 211 is a reflecting mirror having a shape formed, for example, by vertically cutting out a cylinder and has a concave curved surface shape so as to focus on a straight line parallel to the reflecting mirror. As a material of the main light-condensing mirror 211, metal is often used in consideration of the reflectance of sunlight and durability as a structure. However, when metal is used as the material of the main light-condensing mirror 211, the temperature of the main light-condensing mirror 211 increases due to exposure to the sun for a long time, and there is a possibility that the shape of the concave surface is distorted due to thermal expansion. Therefore, although not illustrated in the drawings, a cooling mechanism may be provided to the main light-condensing mirror 211.

By disposing the medium-heating tube 214 on the straight line which is the focal point of the main light-condensing mirror 211, the fluid flowing through the medium-heating tube 214 is heated. The sub light-condensing mirror 212 may be provided in consideration of efficiency and stability of heating the fluid. In the present embodiment, the sub light-condensing mirror 212 is disposed so as to face the main light-condensing mirror 211 in a state where the medium-heating tube 214 is interposed therebetween.

The main light-condensing mirror 211 has a concave shape so that the sunlight can be collected on a straight line. However, due to manufacturing accuracy, a point where the reflected light is collected does not always match between the vicinity of the center of the main light-condensing mirror 211 and portions close to both ends, and thus, it is possible that the reflected light may not be concentrated on the surface of the medium-heating tube 214. Further, the condensed sunlight hits only a surface of the medium-heating tube 214 on the main light-condensing mirror 211 side, and an opposite side of the medium-heating tube 214 is not exposed to direct light of the sun. Accordingly, thermal energy reaching the surface of the medium-heating tube 214 differs between the main light-condensing mirror 211 side and the opposite side, which may cause a temperature difference.

The sub light-condensing mirror 212 is installed to face the main light-condensing mirror 211, and a reflecting surface of the sub light-condensing mirror 212 is a semi-cylindrical-shaped reflecting mirror having a concave mirror surface similar to the main light-condensing mirror 211. The sub light-condensing mirror 212 is disposed to reflect the sunlight, which is condensed by the main light-condensing mirror 211 and passes around the medium-heating tube 214 without hitting the medium-heating tube 214, to the medium-heating tube 214 side again to form a focal point on the medium-heating tube 214. In this case, by disposing the medium-heating tube 214 at a position slightly closer to the main light-condensing mirror 211 than the focal point of the main light-condensing mirror 211, the amount of sunlight passing around the medium-heating tube 214 and reaching the sub light-condensing mirror 212 increases, so that the thermal energy reaching the surface of the medium-heating tube 214 on the main light-condensing mirror 211 side and the thermal energy reaching the surface of the fluid-heating tube 214 on the sub light-condensing mirror 212 side are the same as each other. As a result, effects of improving heating efficiency, and suppressing of the occurrence of strain due to the temperature difference of the medium-heating tube 214 itself are expected.

Since the sub light-condensing mirror 212 and the medium-heating tube 214 are installed with a certain gap from the main light-condensing mirror 211, the sub light-condensing mirror 212 and the fluid-heating tube 214 are connected to each other by the connection bracket 213 so as to maintain the gap therebetween, and are fixed to the main light-condensing mirror 211.

The sub light-condensing mirror 212 may be omitted. In this case, the medium-heating tube 214 may be disposed just at a position where the sunlight condensed by the main light-condensing mirror 211 is collected, and a member for preventing the occurrence of a temperature difference on the surface of the medium-heating tube 214 may be provided. However, here, descriptions thereof are omitted.

The support device 220 fixes the sunlight-condensing device 200 on the ground and supports the light-condensing heating unit 210. Moreover, the support device 220 adjusts a direction of the light-condensing heating unit 210 so that the sunlight is incident at a right angle to the center line of the main light-condensing mirror 211 in order to efficiently condense the sunlight. The support device 220 includes a main pillar 221 which fixes the light-condensing heating unit 210 at a constant height from the ground, an azimuth angle-adjusting device 222 which adjusts the azimuth angle (horizontal angle) of the light-condensing heating unit 210 according to the direction of the sun, and an elevation angle-adjusting device 223 which adjusts the elevation angle (vertical angle) of the light-condensing heating unit 210 according to the altitude of the sun. In general, the azimuth angle-adjusting device 222 and the elevation angle-adjusting device 223 are program-controlled so as to follow the direction of the sun according to the season and the time of day.

Since the sunlight-condensing device 200 has a movable structure as is described above, there is a limit to the size of each device. Therefore, since there is a limit to the thermal energy obtained from one device by condensing sunlight, generally, a plurality of sunlight-condensing devices 200 are disposed to secure required thermal energy.

Figure 4:
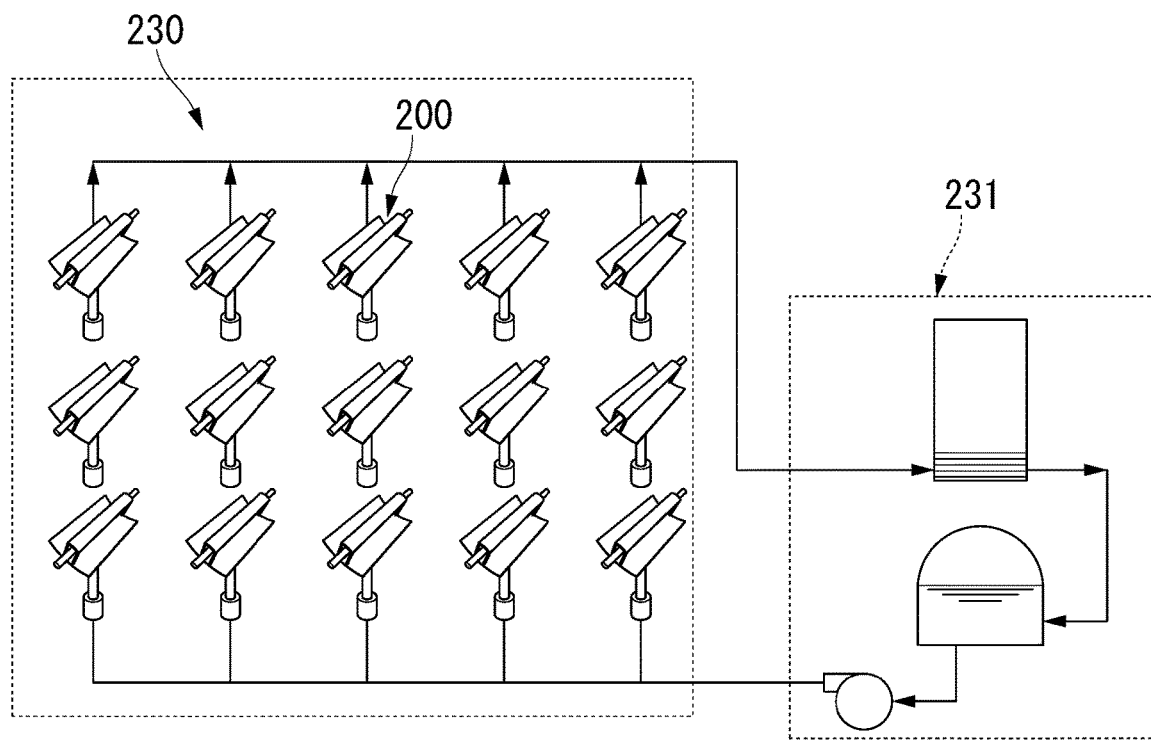
FIG. 4 is a diagram illustrating an arrangement example of a sunlight-condensing heat collection unit of the present disclosure.

FIG. 4 illustrates an arrangement example of the sunlight-condensing devices 200. A sunny and almost flat area is prepared for a solar field 230, and the plurality of sunlight-condensing devices 200 are disposed in the solar field 230 so as not to block the sunlight from each other. An area of the solar field 230 (a land in which the plurality of sunlight-condensing devices 200 are disposed) depends on a total amount of thermal energy to be collected, and industrial applications require an area of at least several hundred square meters, several thousand square meters, or more. In order to collect the thermal energy, which has been collected by the sunlight-condensing devices 200 in the vast area, to a heat utilization facility 231 for use, pipes are laid between the heat utilization facility 231 and the sunlight-condensing devices 200 disposed in the solar field 230, and the thermal energy is collected by circulating the fluid (medium) for carrying heat through the pipes.

The arrangement of the solar field 230 and the heat utilization facility 231 in FIG. 4 is a basic example, and is appropriately changed according to the amount of thermal energy to be collected, the land shape of the solar field 230, or the like. For example, if the heat medium cannot be circulated equally in the sunlight-condensing devices 200 which are disposed many, the sunlight-condensing devices 200 may be divided into a plurality of solar fields 230 and a dedicated heat medium circulation system may be provided for each solar field 230.

Hereinbefore, the heat-storage agent and the sunlight-condensing heat collection unit 2 which are elements of the vapor supply device 1 are described, and hereinafter, the embodiments of the present disclosure will be described in detail with reference to the drawings.

The vapor supply device 1 according to the present embodiment heats the supply medium Z1 and supplies the heated supply medium Z1 to the application destination. For example, the supply medium Z1 is a fluid which is pressurized with respect to the atmospheric pressure, and when the supply medium Z1 is heated, a portion of the supply medium Z1 becomes vapor. As illustrated in FIG. 1, the vapor supply device 1 includes the sunlight-condensing heat collection unit 2, the heat-storage and heat-exchange unit 3, the vapor supply unit 4, and the medium circulation unit 5.

The sunlight-condensing heat collection unit 2 acquires thermal energy from sunlight, and transfers the thermal energy to a heat-storage agent Y1 stored in a heat-storage agent storage tank 3a of the heat-storage and heat-exchange unit 3 via a medium (heat medium X1) for carrying the thermal energy. The heat-storage agent Y1 receives the thermal energy from the heat medium X1 via a primary heat exchanger 3b, and temporarily stores the thermal energy. The heat-storage agent Y1 is in contact with the supply medium Z1 via a secondary heat exchanger 3c, and the thermal energy stored in the heat-storage agent Y1 is transferred to the supply medium Z1.

The supply medium Z1 is heated by the heat-storage agent Y1, and a portion of the supply medium Z1 becomes vapor. In the vapor supply unit 4, the supply medium Z1, a portion of which becomes vapor, is separated into liquid and vapor (vapor medium Z1s), and the separated vapor medium Z1s is finally supplied to the application destination, where the thermal energy is consumed. The vapor medium Z1s that has completed its role by transporting the thermal energy to the application destination is basically recovered, cooled to be condensed, and reused as a replenishment medium Z.

The time that sunlight is condensed and thermal energy can be obtained is limited to the daylight hours, but in the vapor supply device 1 according to the present embodiment, the thermal energy is temporarily stored in the heat-storage agent Y1, and the thermal energy can be continuously supplied to the application destination, which is the final consumer of the thermal energy, via the heat-storage agent Y1. Here, it is necessary that the thermal energy supplied to the application destination satisfies the temperature conditions required by the application destination. The temperature conditions required by the application destination can be satisfied by selecting the type of the heat-storage agent Y1 and the operating range, and arbitrarily selecting the type of the supply medium Z1 that serves as a carrier of the thermal energy in the vapor supply device 1, the usage conditions, the specifications of the device, and the like.

The above has described the first embodiment, but the other embodiments may be also modified as appropriate from the first embodiment.

Hereinafter, the specific contents including the operation of the vapor supply device 1 according to the first embodiment of the present disclosure will be described in detail with reference to FIG. 1.

The sunlight-condensing heat collection unit 2 basically includes a plurality of sunlight-condensing devices 2a, and a single heat medium pump 2b and a single heat medium tank 2c provided for the plurality of sunlight-condensing devices 2a. As in the example of FIG. 4, the plurality of sunlight-condensing devices 2a are disposed in the vast solar field 230 provided in the facility site. The sunlight-condensing heat collection unit 2 is provided with a required number of the sunlight-condensing devices 2a according to the specifications of the thermal energy calculated from the supply condition of the vapor to the application destination. Basically, all of the sunlight-condensing devices 2a are connected in parallel. However, the plurality of sunlight-condensing devices 2a may be connected in series in order to heat the heat medium X1 to a predetermined temperature. The plurality of sunlight-condensing devices 2a connected in series in this way may be one set, and a plurality of sets may be provided in parallel. That is, the arrangement of the sunlight-condensing devices 2a is not limited to the example of FIGS. 1 and 4, and can be any arrangement.

The sunlight-condensing device 2a has the same configuration as the sunlight condensing device 200 shown in FIGS. 3A and 3B, and is adjusted so that the reflecting mirror always faces the sun. The heating tube (heat medium-heating tube) is disposed near the position (focal point) where the sunlight is collected by the reflecting mirror, and both ends of the heating tube are connected to other components of the sunlight-condensing heat collection unit 2 through pipes. The sunlight-condensing device 2a acquires the thermal energy from the sunlight, and heats the heat medium X1 flowing through the heating tube. The heat medium pump 2b pressure-feeds the heat medium X1 stored in the heat medium tank 2c to the heating tube of the sunlight-condensing device 2a. The heat medium X1 in the present embodiment is a pressurized liquid or superheated vapor. The sunlight-condensing device 2a is configured to heat the heat medium X1 to a temperature higher than a temperature selected as the maximum heat-storage temperature (Tmax) of the heat-storage agent Y1.

The heat-storage and heat-exchange unit 3 includes the heat-storage agent storage tank 3a in which the heat-storage agent Y1 is stored. In the heat-storage agent storage tank 3a, the primary heat exchanger 3b which guides the heat medium X1 which has passed through the sunlight-condensing device 2a, the secondary heat exchanger 3c which guides the liquid supply medium Z1, and a stirring device 3d. The primary heat exchanger 3b is installed in a lower portion of the heat-storage agent storage tank 3a in the vertical direction. The secondary heat exchanger 3c is installed above the primary heat exchanger 3b in the vertical direction such that the entirety of the secondary heat exchanger 3c is immersed in the heat-storage agent Y1 stored in the heat-storage agent storage tank 3a.

The phase of the heat-storage agent Y1 stored in the heat-storage agent storage tank 3a is changed between a solid phase and a liquid phase in the operating range, the latent heat is transferred in association with the phase change, and the sensible heat is transferred corresponding to the temperature change. As the transfer of the thermal energy, the heat-storage agent Y1 receives the thermal energy from the heat medium X1 in the primary heat exchanger 3b, and the heat-storage agent Y1 gives the thermal energy to the supply medium Z1 in the secondary heat exchanger 3c. In a time zone (during the daytime on a sunny day) in which the amount of heat collected by the sunlight-condensing heat collection unit 2 is large, the amount of heat exchanged in the primary heat exchanger 3b exceeds the amount of heat exchanged in the secondary heat exchanger 3c, and the amount of heat stored in the heat-storage agent Y1 in the heat-storage agent storage tank 3a increases. However, in a time zone (at night, at sunrise, at sunset, or during the daytime on a cloudy or rainy day) in which the amount of heat collected in the sunlight-condensing heat collection unit 2 decreases and the amount of heat exchanged in the primary heat exchanger 3b is less than the amount of heat exchanged in the secondary heat exchanger 3c, the amount of heat stored in the heat-storage agent Y1 in the heat-storage agent storage tank 3a decreases. In this way, the heat-storage agent Y1 repeats mutual changes between the liquid phase and the solid phase while repeating heat storage and heat dissipation. However, as is described with reference to FIG. 2, the heat-storage agent Y1 is controlled such that all the heat-storage agent Y1 is in a liquid phase, or the heat-storage agent Y1 in a slurry state in which the solid phase is generated in a range in which the fluidity is maintained and the liquid phase and the solid phase coexist.

The stirring device 3d is installed in the heat-storage agent storage tank 3a, and includes, for example, a stirring blade rotated by a motor. The stirring device 3d promotes the flow of the heat-storage agent Y1 stored in the heat-storage agent storage tank 3a. The stirring device 3d may not necessarily stir the heat-storage agent Y1 stored in the heat-storage agent storage tank 3a to a nearly uniform state. The stirring device 3d is used for generating a flow of the heat-storage agent Y1 to prevent the heat-storage agent Y1, which has been changed into the solid phase, from being firmly fixed to a wall of the heat-storage agent storage tank 3a, the heat exchangers 3b and 3c installed in the heat-storage agent storage tank 3a, and the like. The stirring blade may be a propeller-shaped, a spiral-shaped, or any other blade shape used in the stirring device, as long as it can effectively generate a flow of the heat-storage agent Y1. Further, the stirring device 3d is not limited to a rotary type, and may be a reciprocating drive type.

The vapor supply unit 4 includes a vapor drum 4a in which the heated supply medium Z1 is stored. The vapor drum 4a is connected to the secondary heat exchanger 3c provided in the heat-storage and heat-exchange unit 3 via a pipe. A pipe for receiving the liquid replenishment medium Z from the medium circulation unit 5, a pipe connected with an auxiliary boiler 4b, a pipe for supplying the vapor medium Z1s to the application destination, and the like are connected to the vapor drum 4a. Both an inlet and an outlet of the secondary heat exchanger 3c are connected to the vapor drum 4a. The supply medium Z1 in the vapor drum 4a is supplied to the secondary heat exchanger 3c by the gravity. When the supply medium Z1 is heated in the secondary heat exchanger 3c, the supply medium Z1 is expanded and partially evaporated, the specific gravity of the supply medium Z1 becomes lighter, an ascending flow is generated, and the supply medium Z1 is supplied to the vapor drum 4a. That is, a circulating flow of the supply medium Z1 is formed between the vapor drum 4a and the secondary heat exchanger 3c. The circulation of the supply medium Z1 is basically generated by the natural convection, but if smooth flow cannot be obtained by the natural convection, a circulation pump for forced circulation of the supply medium Z1 may be provided.

When the supply medium Z1 is heated by the secondary heat exchanger 3c, a portion of the supply medium Z1 evaporates, and the supply medium Z1 of a liquid with bubbles returns to the vapor drum 4a. When the supply medium 71 reaches the vapor drum 4a, the supply medium Z1 releases the bubbles. The released bubbles form a layer of vapor (vapor medium Z1s) of the supply medium in the upper portion of the vapor drum 4a in the vertical direction, and a layer of the remaining liquid (supply medium Z1) which has released the bubbles is formed in the lower portion of the vapor drum 4a in the vertical direction. In this way, the supply medium Z1 is separated into liquid and vapor (vapor medium Z1s). The liquid supply medium Z1 in the lower portion in the vertical direction is supplied again to the secondary heat exchanger 3c and repeatedly heated.

The supply medium Z1 (vapor medium Z1s) which becomes vapor is taken out from the upper portion of the vapor drum 4a in the vertical direction, supplied to the application destination and used. On the other hand, as a portion of the supply medium Z1 is supplied as the vapor medium Z1s to the application destination, the liquid supply medium Z1 is reduced. Therefore, in order to maintain the proportion of liquid in supply medium Z1 in vapor drum 4a, a new replenishment medium 7 (supply medium Z1) is supplied from the medium circulation unit 5 to the vapor drum 4a via a medium preheater 5b. As a result, a storage amount of the supply medium Z1 in the vapor drum 4a is maintained, the supply medium Z1 is heated to become vapor, and the vapor is continuously supplied as the vapor medium Z1s to the application destination.

The vapor supply unit 4 includes the auxiliary boiler 4b. The auxiliary boiler 4b heats the supply medium Z1 by electric power or combusting a fossil fuel. The auxiliary boiler 4b is activated in a case where the supply medium Z1 cannot be sufficiently heated by the secondary heat exchanger 3c due to the temperature drop of the heat-storage agent Y1 in the heat-storage agent storage tank 3a or the like, and heats the supply medium Z1 instead of the secondary heat exchanger 3c.

In the vapor drum 4a, the liquid supply medium Z1 and the vapor medium Z1s which becomes vapor coexist. The vapor (vapor medium Z1s) is saturated. The temperature of the vapor medium Z1s, which is the saturated vapor, is determined by the pressure in the vapor drum 4a based on the saturated vapor curve. In order to keep the temperature of the vapor (vapor medium Z1s) to be supplied to the application destination constant, the pressure of the entire system for supplying the vapor (vapor medium Z1s) is kept constant. In general, the pressure of the system for supplying the vapor (vapor medium Z1s) is controlled by a pressure control valve 5c provided in the medium circulation unit 5. However, if a large pressure change occurs in the application destination, it may be difficult to stabilize the pressure in the vapor drum 4a. In order to stabilize the operating state of the vapor supply device 1, a mechanism for directly controlling the pressure in the vapor drum 4a may be provided so that the pressure in the vapor drum 4a is kept constant.

The medium circulation unit 5 includes the medium supply pump 5a, the medium preheater 5b, the pressure control valve 5c, a medium condenser 5d, and a medium tank 5e. The replenishment medium Z is stored in the medium tank 5e. The replenishment medium Z is pressurized by the medium supply pump 5a and supplied to a secondary side of the medium preheater 5b. The used vapor medium Z1s recovered from the application destination is supplied to a primary side of the medium preheater 5b.

The operation of the vapor supply device 1 of the present embodiment will be described.

In the vapor supply device 1, the heat medium X1 heated by the sunlight-condensing devices 2a is guided to the primary heat exchanger 3b installed in the heat-storage agent storage tank 3a. The heat medium X1 exchanges heat with the heat-storage agent Y1 in the primary heat exchanger 3b, and the heat is stored in the heat-storage agent Y1.

The secondary heat exchanger 3c which transfer the thermal energy stored in the heat-storage agent Y1 to the supply medium Z1 to heat the supply medium Z1 is installed in the heat-storage agent storage tank 3a. The supply medium Z1 circulates between the secondary heat exchanger 3c and the vapor drum 4a by the convection. That is, the supply medium Z1 is supplied from the vapor drum 4a to one side (inlet) of the secondary heat exchanger 3c by the gravity, and the heated supply medium Z1 flows out from the other side (outlet) of the secondary heat exchanger 3c.

The secondary heat exchanger 3c is arranged with a gentle slope so as to increase the height in the vertical direction from an inflow side to an outflow side. The supply medium Z1 is expanded and partially evaporated by being heated, and moves from the inflow side to the outflow side in the secondary heat exchanger 3c due to the difference in the specific gravity, so that the flow of the supply medium Z1 is generated. The supply medium Z1 returns to the vapor drum 4a through the pipe connected to the outflow side of the secondary heat exchanger 3c. The upper portion of the vapor drum 4a in the vertical direction is filled with the vapor (vapor medium Z1s) of the supply medium Z1. The pipe for returning the supply medium Z1 from the secondary heat exchanger 3c to the vapor drum 4a may be connected near the vapor-liquid interface of the supply medium Z1 in the vapor drum 4a so as not to obstruct the flow of the supply medium Z1.

As described above, as the supply medium Z1 circulates between the vapor drum 4a and the secondary heat exchanger 3c, the supply medium Z1 is heated by the heat-storage agent Y1 in the secondary heat exchanger 3 to generate vapor, and the vapor of the supply medium Z1 is separated in the vapor drum 4a and supplied to the application destination as the vapor medium Z1s. The flow of the supply medium Z1 between the vapor drum 4a and the secondary heat exchanger 3c is basically generated by the natural circulation of the supply medium Z1 by the convection due to the difference in the specific gravity. However, depending on the arrangement of the vapor drum 4a and the secondary heat exchanger 3c, or on the connection path of the pipe connecting the vapor drum 4a and the secondary heat exchanger 3c, it is possible that the smooth flow of the supply medium Z1 may not be ensured. In this case, a pump for forcibly generating a flow of the supply medium Z1 may be provided in the middle of the pipe from the vapor drum 4a to the inflow side of the secondary heat exchanger 3c to forcibly circulate the supply medium Z1.

During the above-described operation, the heat-storage agent Y1 repeats heat storage and heat dissipation in the heat-storage agent storage tank 3a, and the operation during this period will also be described.

In the primary heat exchanger 3b, the thermal energy is transferred from the heat medium X1 heated by the sunlight-condensing devices 2a to the heat-storage agent Y1, and a part or all of the heat-storage agent Y1 in the solid phase is changed to the liquid phase. Further, the heat-storage agent Y1 in the liquid phase also receives the thermal energy, and the temperature of the heat-storage agent Y1 rises from Tmin to Tmax shown in the temperature characteristics of the heat-storage agent Y1 in FIG. 2. The heat-storage agent Y1 moves vertically upward in the heat-storage agent storage tank 3a due to the decrease in the specific gravity accompanying the temperature rise and with the help of the gentle flow of the heat-storage agent Y1 generated by the stirring device 3d, and reaches the secondary heat exchanger 3c.

Heat is transferred from the heat-storage agent Y1 to the supply medium Z1 in the vicinity of the surface of the secondary heat exchanger 3c, and as a result, the heat-storage agent Y1 releases heat and the temperature of the heat-storage agent Y1 decreases from Tmax toward Tmin shown in FIG. 2. When the temperature of the heat-storage agent Y1 reaches the phase change region (the region in which the liquid phase and the solid phase coexist), a part of the heat-storage agent Y1 changes to the solid phase and is attached to the surface of the secondary heat exchanger 3c. The heat-storage agent Y1 that has changed to the solid phase gradually crystal grows on the surface of the secondary heat exchanger 3c, and when the heat-storage agent Y1 grows to some extent, the heat-storage agent Y1 is peeled off from the surface of the secondary heat exchanger 3c, and most of the heat-storage agent Y1 settles due to the difference in the specific gravity with the liquid, and is deposited on the bottom of the heat-storage agent storage tank 3a.

In the above-described operation, a large temperature change within the operating range of the heat-storage agent Y1 is locally generated in the vicinity of the primary heat exchanger 3b and the secondary heat exchanger 3c. However, in order to stably operate the vapor supply device 1 for a long time, it is not preferable that the average temperature of the heat-storage agent Y1 in the entire heat-storage agent storage tank 3a changes significantly. The capacity of the heat-storage agent storage tank 3a and the convection state of the heat-storage agent Y1 may be determined such that the influence of change in the average temperature of the heat-storage agent Y1 in the heat-storage agent storage tank 3a on the supply of the vapor of the supply medium Z1 is minimized in the normal operating conditions. The convection state of the heat-storage agent Y1 may be controlled and managed by the stirring device 3d such that the heat-storage agent Y1 is appropriately used for the transfer of the thermal energy in the primary heat exchanger 3b and the secondary heat exchanger 3c. The temperature of the heat-storage agent Y1 may not necessarily be uniform in the entire heat-storage agent storage tank 3a.

The sunlight-condensing heat collection unit 2 is not operated at night, and the heat-storage agent Y1 continuously heats the supply medium Z1 by releasing the sensible heat and the latent heat while the temperature of the heat-storage agent Y1 gradually decreases in the operating range of the heat-storage agent shown in FIG. 2. The operating range of the heat-storage agent Y1 depends on the composition of the heat-storage agent Y1 as is described above, and for example in a range from 150° C. to 400° C. The proportion of the latent heat in the thermal energy stored in the heat-storage agent Y1 is large compared with the sensible heat. Therefore, in a region in which the liquid phase and the solid phase coexist in the heat-storage agent Y1, since the latent heat is mainly used for heating the supply medium Z1, it is expected that change in the temperature of the heat-storage agent Y1 can be maintained to be extremely small for a long time. During this period, the supply medium Z1 passing through the secondary heat exchanger 3c is continuously heated by the heat-storage agent Y1 and a portion of the supply medium Z1 becomes vapor.

Further, the supply medium Z1 heated by the secondary heat exchanger 3c is supplied to the vapor drum 4a and separated into vapor and liquid, and then the vapor (vapor medium Z1s) is supplied to the application destination. Further, the used vapor medium Z1s recovered from the application destination is supplied to a primary side of the medium preheater 5b and exchanges heat with the liquid supply medium Z1 (replenishment medium Z) sent out from the medium supply pump 5a. Then, the supply medium Z1 passes through the pressure control valve 5c, is condensed by the medium condenser 5d to become a liquid state (replenishment medium Z) at about normal temperature, is temporarily stored in the medium tank 5e, and then is sent out by the medium supply pump 5a and reused.

During this period, depending on the usage mode of the vapor medium Z1s in the application destination, the recovery amount of the vapor medium Z1s may not be equal to the supply amount of the replenishment medium Z, and it may be necessary to add a new liquid replenishment medium Z. It may be also necessary to temporarily store the supply medium Z1 as a buffer against the fluctuations in the supply amount and the recovery amount. By providing the medium tank 5e, the liquid supply medium Z1 is temporarily stored in the medium tank 5e and the shortage of the replenishment medium Z is replenished from the outside. As a result, the circulation of the supply medium Z1 can be stabilized.

Since the vapor and the liquid are in equilibrium in the vapor drum 4a, based on the saturated vapor curve, the temperature of the vapor medium Z1s supplied to the application destination becomes a temperature corresponding to the pressure of the system for supplying the vapor (vapor medium Z1s), that is, to the pressure determined by the pressure control valve 5c. The supply medium Z1 exchanges heat with the heat-storage agent Y1 having a temperature higher than the boiling point of the supply medium Z1 at the pre-determined pressure in the secondary heat exchanger 3c, and the supply medium Z1 having a temperature corresponding to the pre-determined pressure is supplied to the application destination.

The auxiliary boiler 4b is provided in the vapor supply device 1. The auxiliary boiler 4b is activated in the following cases, and assists the supply of the vapor to the application destination. The operation of the auxiliary boiler 4b will be described below.

First, when the vapor supply device 1 is activated, the thermal energy obtained by the sunlight-condensing heat collection unit 2 is not stable. Therefore, the supply medium Z1 is not sufficiently heated and the required amount of the vapor cannot be obtained. In this case, by activating the auxiliary boiler 4b, the heating of the supply medium Z1 is promoted to generate vapor, thereby securing the amount of vapor. During this period, the supply medium Z1 is supplied from the vapor drum 4a not only to the secondary heat exchanger 3c but also to the auxiliary boiler 4b, and the supply medium Z1 is heated by the thermal energy obtained by combusting the fuel. As a result, a portion or all of the supply medium Z1 is changed into vapor, and the vapor of the supply medium Z1 is supplied to the application destination via the vapor drum 4a.

Secondly, if the situation where sufficient thermal energy cannot be obtained from the sunlight-condensing heat collection unit 2 continues for a long time, such as when the weather is bad, the latent heat stored in the heat-storage agent Y1 continuously decreases, and as a result, the temperature of the heat-storage agent Y1 gradually decreases. If the temperature of the heat-storage agent Y1 drops below Tmin, the fluidity of the heat-storage agent Y1 decreases, and heat transfer in the heat exchangers 3b and 3c may be hindered. In this case, the heat transfer to the supply medium Z1 in the secondary heat exchanger 3c is limited, and the auxiliary boiler 4b is activated to secure the amount of vapor medium Z1s to be supplied to the application destination.

As described above, the temperature of the heat-storage agent Y1 may be kept within the operating range (within the temperature between Tmax and Tmin), and it is necessary to avoid the temperature of the heat-storage agent Y1 from dropping below Tmin by progress of heat dissipation.

When the temperature of the heat-storage agent Y1 reaches Tmin, the supply of the supply medium Z1 to the secondary heat exchanger 3c may be stopped and the supply of the vapor may be switched to the supply by the auxiliary boiler 4b regardless of the operating conditions of the auxiliary boiler 4b as is exemplified above.

According to the present embodiment, the vapor supply device 1 stores thermal energy, which is obtained in the sunlight-condensing heat collection unit 2, in the heat-storage agent Y1, and heats the supply medium Z1 to generate vapor. Accordingly, it is possible to generate vapor of the supply medium Z1 by the thermal energy stored in the heat-storage agent Y1 even in a time zone in which the thermal energy obtained from the sunlight is insufficient, such as at night or when the weather is bad, and it is possible to stably supply the vapor of the supply medium Z1.

Further, the thermal energy obtained by the sunlight-condensing heat collection unit 2 changes with the time passage even during the daytime, but the amount of heat transferred to the supply medium Z1 passing through the secondary heat exchanger 3c is leveled by transferring the heat via the heat-storage agent Y1. As a result, the fluctuation in the amount of evaporation of the supply medium Z1 can be suppressed, and the vapor can be stably supplied.

Furthermore, since the thermal energy obtained from sunlight in the sunlight-condensing devices 2a is transferred to the heat-storage agent Y1 via the heat medium X1 and is stored in the heat-storage agent Y1, the thermal energy can be transferred without transferring the heat-storage agent Y1 from the heat-storage agent storage tank 3a to the outside. Accordingly, it is possible to prevent the trouble of blocking a pipe which is concerned when the heat-storage agent Y1 is transferred through the pipe or the like, that is, it is possible to prevent the flowing of the heat-storage agent Y1 from being hindered due to the increase in the viscosity of the heat-storage agent Y1 accompanying the temperature decrease and the firm-fixing of the heat-storage agent Y1 to an inner surface of the pipe, which may make it difficult to continue the operation of the vapor supply device 1.

Further, by providing the stirring device 3d in the heat-storage agent storage tank 3a, a circulating flow of the heat-storage agent Y1 between the primary heat exchanger 3b and the secondary heat exchanger 3c is formed in the heat-storage agent storage tank 3a. Accordingly, the thermal energy stored in the heat medium X1 supplied to the primary heat exchanger 3b is reliably transferred to the supply medium Z1 supplied to the secondary heat exchanger 3c via the heat-storage agent Y1. There is a possibility that a portion of the heat-storage agent Y1 solidifies and covers the surface of the secondary heat exchanger 3c, which may hinder the transmission of the thermal energy. The flow of the heat-storage agent Y1 generated by the stirring device 3d can promote the peeling of the solidified heat-storage agent Y1 and prevent the growth of the solidified layer of the heat-storage agent Y1 which hinders the transmission of the thermal energy.

In addition to the above configuration, if the supply of the thermal energy from the sunlight-condensing heat collection unit 2 is insufficient, an electric heater (not shown) may be provided in a bottom portion of the heat-storage agent storage tank 3a in order to prevent the temperature of the heat-storage agent Y1 in the heat-storage agent storage tank 3a from decreasing below Tmin and the fluidity of the heat-storage agent Y1 from losing. Alternatively, an auxiliary boiler (not shown) for heat medium may be provided in parallel with the sunlight-condensing device 2a. In this case, the auxiliary boiler for heat medium can heat the heat medium X1 even when the supply of the thermal energy from the sunlight-condensing heat collection unit 2 is insufficient.

Further, if the vapor supply device 1 is stopped for a long time, it is necessary to avoid solidification of the heat-storage agent Y1 in order to smoothly restart the vapor supply device 1. Therefore, the electric heater or the auxiliary boiler for heat medium may be used during the stop period of the vapor supply device 1 to keep the temperature of the heat-storage agent Y1 in the vicinity of Tmin, so that the fluidity of the heat-storage agent Y1 is maintained.

Second Embodiment

A modification example of the vapor supply device 1 of the first embodiment will be described as a second embodiment. The same components have the same reference numerals, and descriptions thereof will be omitted.

Figure 5:
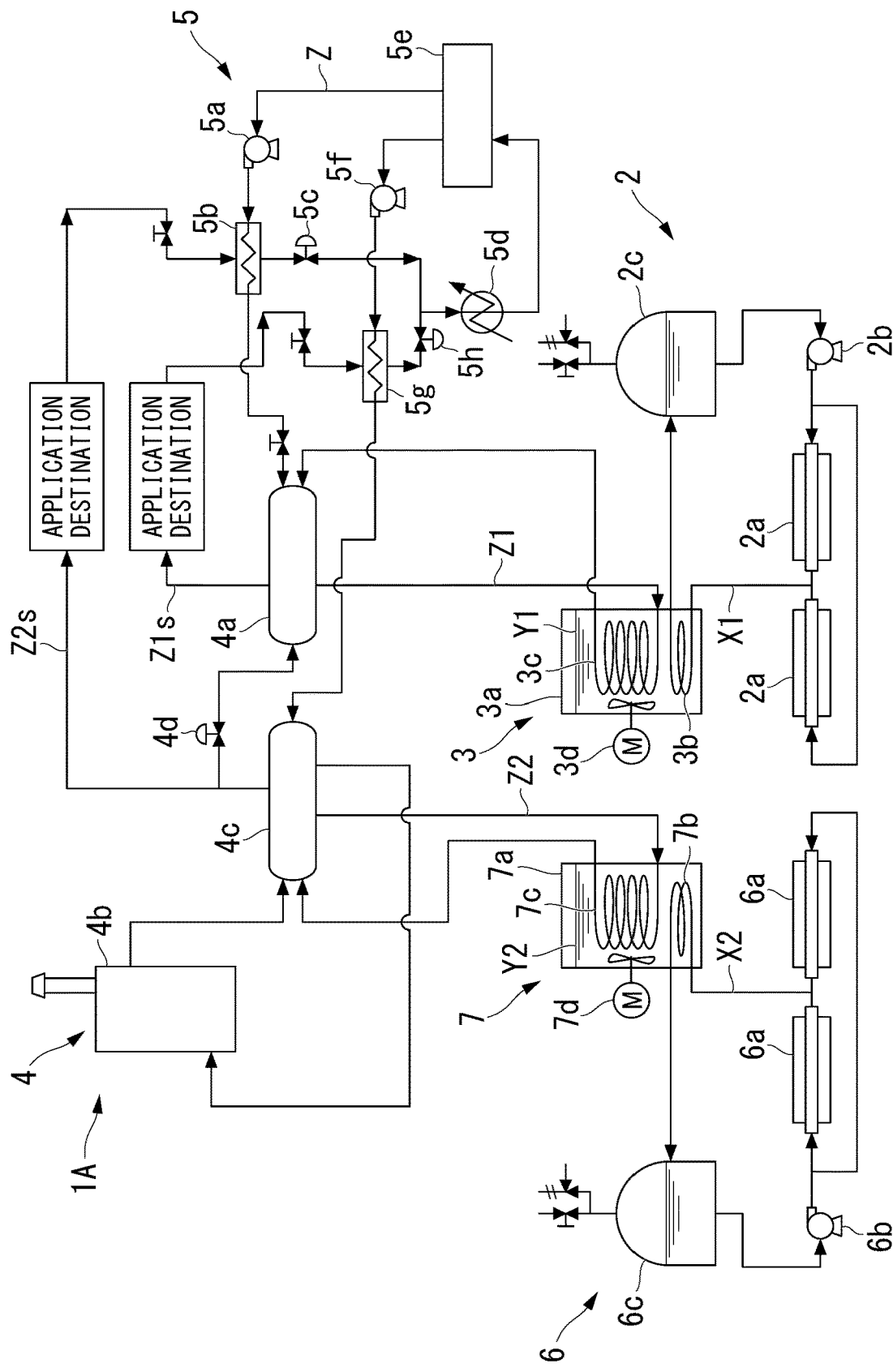
FIG. 5 is a schematic diagram illustrating a configuration of a vapor supply device according to a second embodiment of the present disclosure.

As shown in FIG. 5, a vapor supply device 1A according to the present embodiment further includes a second sunlight-condensing heat collection unit 6, a second heat-storage and heat-exchange unit 7, and a second vapor drum 4c, in addition to the sunlight-condensing heat collection unit 2, the heat-storage and heat-exchange unit 3, the vapor supply unit 4, and the medium circulation unit 5. The configurations and operations of the second sunlight-condensing heat collection unit 6, the second heat-storage and heat-exchange unit 7 and the second vapor drum 4c (hereinafter referred to as a second system) are basically the same as the vapor supply device 1 (hereinafter referred to as a first system) described in the first embodiment. The vapor supply device 1A respectively and independently supplies vapor (vapor medium Z1s) of the supply medium Z1 supplied from the first system and vapor (second vapor medium Z2s) of a second supply medium Z2 supplied from the second system to the application destination. Accordingly, it is possible to supply vapors under different temperature and pressure conditions.

In FIG. 5, the replenishment medium Z is stored in the common medium tank 5e, and the medium supply pump 5a and a second medium supply pump 5f are connected to the medium tank 5e. The replenishment medium Z is supplied as the supply medium Z1 from the medium supply pump 5a and as the second supply medium Z2 from the second medium supply pump 5f, that is, the replenishment medium Z can be supplied by independent systems under different pressure conditions. Since the configuration and operation of the second medium supply pump 5f are the same as those of the medium supply pump 5a, the configuration and operation of a second medium preheater 5g are the same as those of the medium preheater 5b, and the configuration and operation of a second pressure control valve 5h are the same as those of the pressure control valve 5c, descriptions thereof will be omitted.

The second sunlight-condensing heat collection unit 6 is a circulation system of a heat medium X2 and is independent of the sunlight-condensing heat collection unit 2. The basic configuration of the second sunlight-condensing heat collection unit 6 is the same as that of the sunlight-condensing heat collection unit 2 and includes sunlight-condensing devices 6a, a heat medium pump 6b, and a heat medium tank 6c. The sunlight-condensing devices 6a obtain thermal energy from sunlight and heat the heat medium X2. The heat medium X2 is stored in the heat medium tank 6c.

The second heat-storage and heat-exchange unit 7 includes a second heat-storage agent storage tank 7a in which a heat-storage agent Y2 is stored. In the second heat-storage agent storage tank 7a, a primary heat exchanger 7b which guides the heat medium X2 which has passed through the sunlight-condensing device 6a, a secondary heat exchanger 7c which guides the second supply medium Z2, and a stirring device 7d which stirs the heat-storage agent Y2 are provided. Similar to the heat-storage agent Y1 used for the first system, the heat-storage agent Y2 is a mixed salt such as nitrate of an alkali metal element. The heat-storage agent Y2 may be a heat-storage agent having a different operating range from the heat-storage agent Y1 by using the fact that the temperature at which the phase change occurs differs depending on the type of the alkali metal element and the composition of the mixed salt.

In the vapor supply device 1A, the first system and the second system can be operated under different conditions. As a result, by supplying the vapor (vapor medium Z1s) of the supply medium 71 generated by the thermal energy obtained in the sunlight-condensing heat collection unit 2 to a first application destination and supplying the vapor (vapor medium Z2s) of the second supply medium Z2 generated by the thermal energy obtained in the second sunlight-condensing heat collection unit 6 to a second application destination, it is possible to simultaneously supply the vapor of the supply medium Z1 and the vapor of the second supply medium Z2 under different temperature and pressure conditions.

Since the detailed description of the operations of the first system and the second system is the same as that described in the first embodiment, the description thereof will be omitted.

The heat medium X1 may be heated to a condition in which the heat-storage agent Y1 can be heated to a predetermined upper limit temperature (Tmax) in the primary heat exchanger 3b in the heat-storage agent storage tank 3a, and the heat medium X2 may be heated to a condition in which the heat-storage agent Y2 can be heated to a predetermined upper limit temperature (Tmax) in the primary heat exchanger 7b in the second heat-storage agent storage tank 7a. The supply conditions of the heat medium X1 and the heat medium X2 can be freely selected as long as they meet the above conditions. For example, the temperature and pressure conditions of the heat medium X1 and the heat medium X2 may be arbitrarily selected. Water or a solvent other than water may be used as the heat medium X1 and the heat medium X2. The supply conditions of the heat medium X1 and the heat medium X2 may be the same as long as the heat-storage agent Y1 and the heat-storage agent Y2 can be heated without hindrance. In this case, some equipment may be omitted by sharing the circulation system of the heat medium X1 and the circulation system of the heat medium X2. Further, in this case, the thermal energy obtained by the sunlight-condensing devices 2a (6a) can be distributed to the heat-storage agent Y1 and the heat-storage agent Y2 at a required ratio, and the thermal energy can be effectively used according to the supply conditions of the supply medium Z1 and the second supply medium Z2.

Further, in FIG. 5, the supply medium Z1 and the second supply medium Z2 are supplied from the common medium tank 5e, but medium tanks may be provided separately. In this case, the supply medium Z1 and the second supply medium Z2 can be operated as independent systems.

For example, when water is used as a common medium, the vapor of the supply medium Z1 is supplied at a gauge pressure of 0.5 MPa, and the vapor of the second supply medium Z2 is supplied at a gauge pressure of 1.5 MPa, the saturated vapor temperature of the vapor medium Z1s is approximately 160° C. and the saturated vapor temperature of the second vapor medium Z2s is approximately 200° C.

When the medium tank 5e is provided separately for the supply medium Z1 and the second supply medium Z2, different media such as water and a solvent other than water may be used as the supply medium Z1 and the second supply medium Z2. By using a solvent having a boiling point higher than that of water, it is possible to supply vapor having a high-temperature of exceeding 200° C. even at a pressure of about 1.5 MPa. Therefore, the temperature difference between the vapor medium Z1s and the second vapor medium Z2s can be increased as compared with a case where water is used as a common medium.

As shown in FIG. 5, similar to the first embodiment, the auxiliary boiler 4b is also provided in the second embodiment. The auxiliary boiler 4b is connected only to the second vapor drum 4c. The role of the auxiliary boiler 4b is the same as that of the first embodiment. In the present embodiment, the pressure in the second vapor drum 4c is higher than that of the vapor drum 4a so that auxiliary vapor can be supplied from the second vapor drum 4c to the vapor drum 4a via the vapor pressure-reducing valve 4d. Accordingly, auxiliary vapor can be simultaneously supplied to the second vapor drum 4c and the vapor drum 4a with one auxiliary boiler 4b.

The above description assumes that the first system (system for supplying the vapor medium Z1s) and the second system (system for supplying the vapor medium Z2s) of the vapor supply device 1A are covered by one auxiliary boiler 4b. However, of course, auxiliary boilers may be respectively provided in the systems. In this case, interference between the systems can be prevented and the degree of freedom of the systems can be increased, so that vapor can be supplied under more stable temperature conditions.

Third Embodiment

A modification example of the vapor supply device 1 of the first embodiment will be described as a third embodiment. The same components have the same reference numerals, and descriptions thereof will be omitted.

Figure 6:
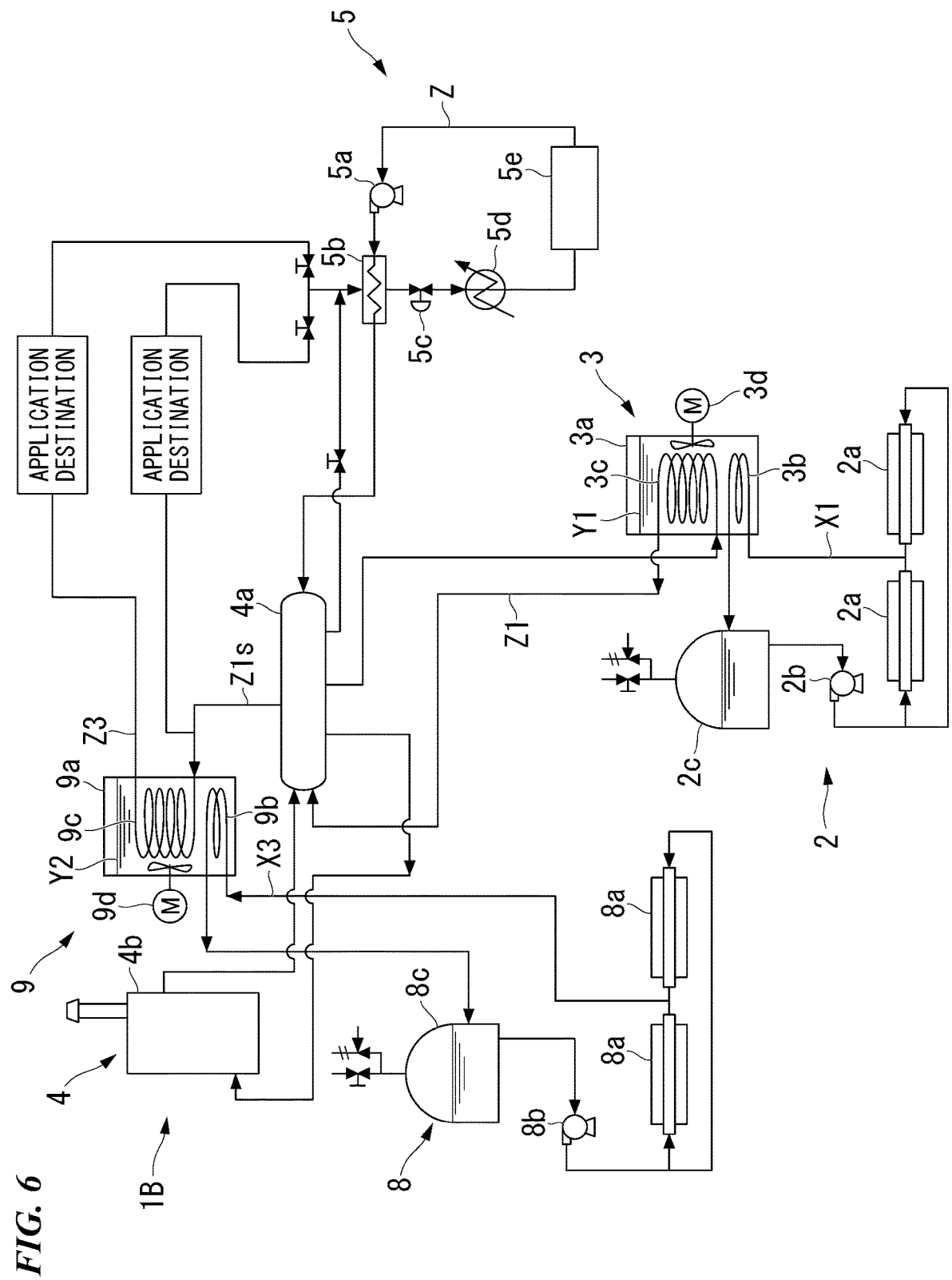
FIG. 6 is a schematic diagram illustrating a configuration of a vapor supply device according to a third embodiment of the present disclosure.

As shown in FIG. 6, a superheated vapor supply device (vapor supply device) 1B according to the present embodiment further includes a superheat system sunlight-condensing heat collection unit 8 (second sunlight-condensing heat collection unit) and a superheat system heat-storage and heat-exchange unit 9 (second heat-storage and heat-exchange unit), in addition to the sunlight-condensing heat collection unit 2, the heat-storage and heat-exchange unit 3, the vapor supply unit 4, and the medium circulation unit 5. The configuration and operation of the superheat system sunlight-condensing heat collection unit 8 are substantially the same as those of the sunlight-condensing heat collection unit 2. However, in the superheat system sunlight-condensing heat collection unit 8, the supply condition of the superheat system heat medium X3 is selected in accordance with an operating range of a superheat system heat-storage agent Y3 stored in a superheat system heat-storage agent storage tank 9a of the superheat system heat-storage and heat-exchange unit 9. That is, the supply condition of the superheat system heat medium X3 in the superheat system sunlight-condensing heat collection unit 8 is different from the supply condition of the heat medium X1 in the sunlight-condensing heat collection unit 2.

The superheat system heat-storage agent Y3 is stored in the superheat system heat-storage agent storage tank 9a. In the superheat system heat-storage agent storage tank 9a, a superheat system primary heat exchanger 9b which guides the superheat system heat medium X3 which has passed through a superheat system sunlight-condensing device 8a, a superheat system secondary heat exchanger 9c, and a stirring device 9d which stirs the superheat system heat-storage agent Y3 are provided. A portion of the vapor medium Z1s to be supplied from the vapor drum 4a to the application destination is branched and supplied to the superheat system secondary heat exchanger 9c, and is heated therein. The heated vapor medium Z1s becomes superheated vapor, and is supplied to the application destination as a superheated vapor medium Z3s. Further, a portion of the remaining vapor medium Z1s is supplied to the application destination as the saturated vapor (vapor medium Z1s) without passing through the superheat system secondary heat exchanger 9c.

As the superheat system heat-storage agent Y3, a heat-storage agent having a higher operating range than the heat-storage agent Y1 may be used. As the super heat system heat-storage agent Y3, a heat-storage agent having the same composition as the heat-storage agent Y1 may be used. For example, the heat-storage agent Y1 and the superheat system heat-storage agent Y3 may not necessarily have different compositions as long as the superheat system heat-storage agent Y3 can be operated under conditions that do not interfere with the superheating of the vapor medium Z1s.

In the superheated vapor supply device 1B, in addition to the heating of the heat medium X1 in the sunlight-condensing heat collection unit 2, the superheat system heat medium X3 is heated in the superheat system sunlight-condensing heat collection unit 8. In general, it is required that the superheat system heat-storage agent Y3 is operated at a temperature higher than the heat-storage agent Y1. Therefore, the supply condition of the superheat system heat medium X3 is selected such that the superheat system heat medium X3 is heated to a temperature higher than the heat medium X1. The temperature of the superheat system heat medium X3 is higher than the upper limit of the operating range of the heat-storage agent Y3. The superheat system heat medium X3 which has passed through the superheat system sunlight-condensing device 8a exchanges heat with the superheat system heat-storage agent Y3 in the superheat system heat-storage agent storage tank 9a.

The operating range of the superheat system heat-storage agent Y3 is higher at least than the temperature of the vapor medium Z1s supplied from the vapor drum 4a, that is, higher than the temperature of the supply medium Z1 heated in the heat-storage agent storage tank 3a. Accordingly, the vapor medium Z1s is further heated by the superheat system heat-storage agent Y3 to become superheated vapor (superheated vapor medium Z3s).

In the superheated vapor supply device 1B, in addition to the vapor medium Z1s obtained by heating the supply medium Z1, the superheated vapor medium Z3s is obtained by further heating the vapor medium Z1s to generate superheated vapor. Therefore, the vapor medium Z1s and the superheated vapor medium Z3s can be respectively and independently supplied to the application destination.

The used vapor medium Z1s and the used superheated vapor medium Z3s are recovered from the application destination. The used vapor medium Z1s and the used superheated vapor medium Z3s are combined, pass through the medium preheater 5b, the pressure control valve 5c, and the medium condenser 5d, and recovered (stored in the medium tank Se) as the liquid replenishment medium Z. The replenishment medium Z may be preheated more efficiently by using the temperature difference between the saturated vapor (vapor medium Z1s) and the superheated vapor (superheated vapor medium Z3s). That is, the medium preheater 5b is divided into two, and the replenishment medium Z sent out from the medium supply pump 5a is initially guided to the first medium preheater 5b to exchange heat with the recovered saturated vapor (vapor medium Z1s) and then guided to the second medium preheater Sb to exchange heat with the recovered superheated vapor (superheated vapor medium Z3s). By preheating the replenishment medium Z in two stages in this way, the replenishment medium Z can be supplied to the vapor drum 4a at a higher temperature compared with a case where the replenishment medium Z is preheated in one stage. Therefore, it is possible to improve the thermal efficiency of the entire superheated vapor supply device 1B.

In the superheated vapor supply device 1B of the present embodiment, in addition to the supply of the saturated vapor (vapor medium Z1s), it is possible to supply the superheated vapor (superheated vapor medium Z3s) to the application destination.

If the application destination does not require the saturated vapor, all of the vapor medium Z1s may be heated and supplied as the superheated vapor medium Z3s. By supplying all of the vapor medium Z1s as the superheated vapor medium Z3s, the supply of the vapor medium Z1s, which is the saturated vapor, does not affect the supply of the superheated vapor medium Z3s, and the superheated vapor can be stably supplied.

Fourth Embodiment

A drying system S including the superheated vapor supply device 1B of the present disclosure will be described as a fourth embodiment. The same components have the same reference numerals, and descriptions thereof will be omitted.

Figure 7:
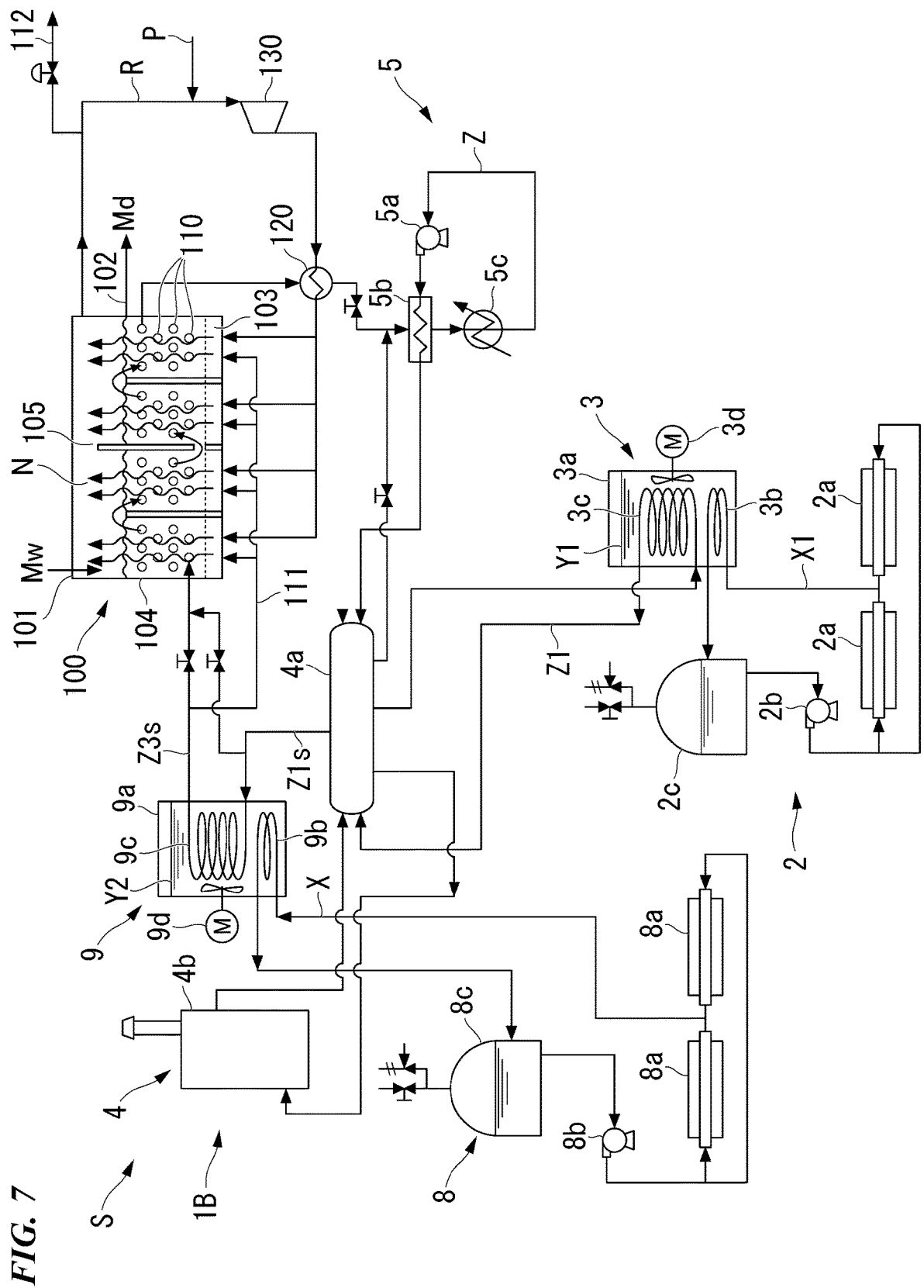
FIG. 7 is a schematic diagram illustrating a configuration of a drying system according to a fourth embodiment of the present disclosure.

As illustrated in FIG. 7, the drying system S of the present embodiment includes the superheated vapor supply device 1B and a fluidized bed-drying device 100. The drying system S dries a high-humidity raw material Mw (high-moisture solid fuel typified by biomass, palm residue, and lignite). The fluidized bed-drying device 100 dries the high-humidity raw material M while flowing the high-humidity raw material M. The high-humidity raw material pulverized to a size capable of flowing is supplied to the fluidized bed-drying device 100.

The drying device 100 includes a heating vapor pipe 110, a fluidized gas air box 103, a drying chamber 104, a drying chamber partition wall 105, a superheated vapor pressure-reducing valve 111, a fluidized gas heater 120, and a fluidized gas blower 130. A plurality of the heating vapor pipes 110 are provided in a layer of the high-humidity raw material Mw forming a fluidized bed inside the drying chamber 104 so as to be orthogonal to a flow of a fluidized gas N. Any one of the vapor medium Z1s (saturated vapor) and the superheated vapor medium Z3s is passed through the inside of the heating vapor pipe 110. Used vapor which has passed through the heating vapor pipe 110 is passed through a primary side of the fluidized gas heater 120, and a portion of a gas used for fluidizing the high-humidity raw material Mw is guided to a secondary side of the fluidized gas heater 120 via the fluidized gas blower 130. The gas used for fluidizing the high-humidity raw material Mw is heated by heat exchange with the used vapor and supplied to the fluidized gas air box 103 as the fluidized gas N. An inert gas P is supplied to an inlet side of the fluidized gas blower 130. The inert gas P is supplied to the fluidized gas blower 130 as needed, for example when the drying device 100 is activated. Further, a portion of the superheated vapor medium Z3s is supplied to the fluidized gas air box 103 via the superheated vapor pressure-reducing valve 111.

In the superheated vapor supply device 1B, the vapor medium Z1s, which is saturated vapor obtained by heating the supply medium Z1 and being separated in the vapor supply unit 4, is guided to the superheating heat exchanger 9c, is further heated by the superheating heat-storage agent Y2, and becomes the superheated vapor medium Z3s. The superheated vapor medium Z3s is supplied to the drying device 100. The superheated vapor supply device 1B can also supply the saturated vapor (vapor medium Z1s) to the drying device 100. Any one of the vapor medium Z1s and the superheated vapor medium Z3s is supplied to the heating vapor pipe 110 according to operating conditions of the drying system 100. Only the superheated vapor medium Z3s is supplied to the fluidized gas air box 103.

The operation of the drying system S in the present embodiment will be described with reference to FIG. 7.

In the fluidized-bed drying device 100, the high-humidity raw material Mw is dried while forming the fluidized bed. The fluidized gas blower 130 is activated and the gas (the circulating gas R) is circulated, and the high-humidity raw material Mw is fluidized using the circulating gas R. The circulating gas R is sent out from the fluidized gas blower 130, heated by the fluidized gas heater 120 and then supplied to the fluidized gas air box 103. The drying chamber 104 provided above the fluidized gas air box 103 in the vertical direction and the fluidized gas air box 103 are separated by a dispersion mechanism (not illustrated). The gas supplied to the fluidized gas air box 103 is dispersed by the dispersion mechanism and injected into the drying chamber 104. Further, the dispersion mechanism prevents the high-humidity raw material Mw supplied into the drying chamber 104 from falling into the fluidized gas air box 103. The fluidized gas N used for fluidizing the high-humidity raw material Mw in the drying chamber 104 is discharged from an upper portion of the drying chamber 104.

The fluidized gas N discharged from the drying chamber 104 contains a large amount of water evaporated from the high-humidity raw material Mw. An atmospheric release valve 112 is provided in a pipe connecting the drying chamber 104 and the fluidized gas blower 130 to each other, and a portion of the fluidized gas N is discharged to an outside (the atmosphere) of the system to adjust the amount of moisture of the fluidized gas N circulating through the system. A portion of the fluidized gas N is released to the atmosphere from the outlet of the drying chamber 104, and the remaining fluidized gas N is guided to the fluidized gas blower 130 as the circulating gas R and reused. Further, the atmospheric release valve 112 has a pressure controlling function to keep the pressure in the drying device 100 constant.

A heat source for drying the high-humidity raw material Mw is the vapor (vapor medium Z1s or superheated vapor medium Z3s) supplied to the heating vapor pipe 110, the circulating gas R circulated by the fluidized gas blower 130, and the superheated vapor medium Z3s supplied to the fluidized gas air box 103. Any one of the vapor medium Z1s and the superheated vapor medium Z3s is selected and supplied to the heating vapor pipe 110 according to a temperature required for a drying operation. The vapor supplied to the heating vapor pipe 110 directly exchanges heat with the high-humidity raw material Mw supplied to the drying chamber 104 to heat the high-humidity raw material Mw, and promotes evaporation of water of the high-humidity raw material Mw. The fluidized gas N (circulating gas R) injected into the drying chamber 104 from the fluidized gas air box 103 fluidizes the high-humidity raw material Mw and promotes drying by removing the water evaporated from the high-humidity raw material Mw. Further, by preheating the fluidized gas N (circulating gas R) and supplying the preheated fluidized gas N to the drying chamber 104, a degree of drying by the fluidized gas N increases, more water evaporated from the high-humidity raw material Mw can be removed by the fluidized gas N, and thus, the drying is further promoted. The vapor supplied to the heating vapor pipe 110 is used for heating the high-humidity raw material Mw and then is supplied to the primary side of the fluidized gas heater 120 and heats the circulating gas R by heat exchange. Thereby, the temperature of the fluidized gas N is raised, and the drying is promoted.

The drying chamber 104 has a substantially rectangular parallelepiped shape. The drying chamber partition walls 105 are disposed so as to cross a horizontal long side of the drying chamber 104. A raw material supply unit 101 for supplying the high-humidity raw material Mw is provided at one end in a long side direction of the rectangular parallelepiped drying chamber 104. A raw material discharge unit 102 for discharging a dried raw material Md is provided at the other end in the long side direction of the drying chamber 104 opposite to the raw material supply unit 101. When the high-humidity raw material Mw supplied from the raw material supply unit 101 moves in the drying chamber 104 while forming a fluidized bed and reaches the raw material discharge unit 102, the high-humidity raw material Mw overflows from the upper portion of the fluidized bed and is discharged to the outside of the drying chamber 104. The raw material discharge unit 102 is provided in the upper portion of the drying chamber 104 in the vertical direction. The height of the fluidized bed of the high-humidity raw material Mw in the drying chamber 104 is determined by the position of the raw material discharge unit 102.

In order to form a fluidized bed in the drying chamber 104, the high-humidity raw material Mw is pulverized in advance to a size suitable for fluidization, and then supplied. The pulverized high-humidity raw material Mw is continuously supplied from the raw material supply port 101 at a constant flow rate. The high-humidity raw material Mw supplied into the drying chamber 104 forms the fluidized bed in the drying chamber 104. The drying chamber 104 is divided into a plurality of sections by the drying chamber partition walls 105, and fluidized gas N is supplied to each section from a bottom. An opening though which the high-humidity raw material Mw passes is provided in an upper portion or a lower portion of the respective drying chamber partition wall 105. The high-humidity raw material Mw sequentially moves to the adjacent section through the opening, so that the fluidized bed of the high-humidity raw material Mw is formed in the entire drying chamber 104.

The high-humidity raw material Mw supplied from the raw material supply unit 101 is gradually dried while forming the fluidized bed through the plurality of sections provided in the drying chamber 104, and when the high-humidity raw material Mw reaches the section in which the raw material discharge unit 102 is provided, the high-humidity raw material Mw is dried to have a predetermined moisture content. After that, the high-humidity raw material Mw which has been dried to have the predetermined moisture content overflows and is discharged as the dried raw material Md from the raw material discharge unit 102 to the outside of the drying chamber 104.

The pressure inside the drying chamber 104 is substantially the atmospheric pressure. In order to promote the evaporation of water from the high-humidity raw material Mw, the temperature in the drying chamber 104 is controlled so as to sufficiently exceed 100° C. Since many of the high-humidity raw materials Mw, such as biomass and lignite, have the property of easily spontaneously igniting as the drying progresses, it is not preferable that the fluidized gas N contain oxygen or the like having flammability. Therefore, air is not used as the fluidized gas N, and, for example, an inert gas is used as the fluidized gas N. Nitrogen is a typical example of the inert gas, but a cost of producing the gas becomes an issue for continuous use. In the present embodiment, the superheated water vapor (dry vapor) is used as the fluidized gas N. However, when the drying system S is activated, the temperature inside the drying chamber 104 may be 100° C. or lower, and water vapor may be condensed. Therefore, the inert gas P is supplied and used for fluidizing the high-humidity raw material Mw until the temperature in the drying chamber 104 becomes sufficiently high.

In the present embodiment, an inside of the drying chamber 104 is divided into four sections, and the high-humidity raw material Mw is supplied to the first section, moves in the order of the upper side, the lower side, and the upper side of the drying chamber partition walls 105 and is discharged from the upper portion of the most downstream section (fourth section). However, the number of sections, the position (upper side, lower side) of the drying chamber partition wall 105 through which the high-humidity raw material Mw passes, and the like are arbitrarily selected and are not limited to FIG. 7.

According to the present embodiment, while storing thermal energy obtained by condensing sunlight, the saturated vapor (vapor medium Z1s) and the superheated vapor (superheated vapor medium Z3s) obtained by using the stored thermal energy are supplied to the fluidized bed-drying device 100. Accordingly, the high-humidity raw material Mw can be continuously and stably dried day and night.

Hereinbefore, the embodiments of the present disclosure have been described with reference to the drawings. However, the present disclosure is not limited to the above embodiments. The various shapes and combinations of the constituent members illustrated in the above-described embodiment are examples, and can be variously changed based on design requirements and the like without departing from the spirit of the present disclosure.

In the above embodiments, the case where saturated vapor is supplied to the application destination, the case where two types of saturated vapors having different temperatures are simultaneously supplied to the application destination, and the case where saturated vapor and superheated vapor are simultaneously supplied to the application destination have been described. However, vapor to be supplied to the application destination may be a combination of three or more types of saturated vapor and superheated vapor.

Further, as the replenishment medium Z, for example, water is generally used, but a fluid other than water may be heated and supplied as a supply medium. Further, the heat medium used for the sunlight-condensing device is not limited to water, and for example, oil or the like may be used. In this case, by using a fluid having a boiling point higher than that of water as the heat medium, it is possible to bring the heat medium to a higher temperature state than water without pressurizing the heat medium.

Further, the shape of the sunlight-condensing device 2a is not limited to the above embodiments as long as it can condense sunlight and heat a fluid (heat medium).

In the fourth embodiment, the drying system S using the fluidized bed-drying device 100 that dries the high-humidity raw material Mw while flowing the high-humidity raw material Mw as the application destination has been described. However, the application destination of the present disclosure is not limited. For example, the saturated vapor or the superheated vapor may be used as a heat source for chemical processes. Alternatively, the vapor itself may be used as a chemical raw material. Furthermore, the saturated vapor or the superheated vapor may be used as a power source for driving a steam turbine. The saturated vapor or the superheated vapor may be supplied to various application destinations.

Further, the vapor supply device may not necessarily include the auxiliary boiler 4b. Further, when two or more types of vapors having different temperatures are supplied to the application destination, an auxiliary boiler may be provided for each type of vapor.

The present disclosure can be applied to a vapor supply device which condenses sunlight and uses the condensed sunlight as a heat source.

What is claimed is:

1. A vapor supply device comprising:
   a sunlight-condensing heat collector which condenses sunlight and collects heat to obtain thermal energy;
   a heat-storage and heat-exchanger which includes a heat-storage agent storage tank in which a heat-storage agent is stored, and a stirrer which is installed in the heat-storage agent storage tank and stirs the heat-storage agent, and heats the heat-storage agent stored therein using the thermal energy obtained in the sunlight-condensing heat collector and stores thermal energy in the heat-storage agent, and heats a supply medium using the thermal energy stored in the heat-storage agent;
   a vapor supplier which supplies, to an application destination, a vapor of the supply medium obtained by heating the supply medium in the heat-storage and heat-exchanger;
   a superheat system sunlight-condensing heat collector which condenses sunlight and collects heat to obtain thermal energy; and
   a superheat system heat-storage and heat-exchanger which includes a superheat system heat-storage agent storage tank in which a superheat system heat-storage agent is stored, and a superheat system stirrer which is installed in the superheat system heat-storage agent storage tank and stirs the superheat system heat-storage agent, and heats the superheat system heat-storage agent stored therein using the thermal energy obtained in the superheat system sunlight-condensing heat collector and stores thermal energy in the superheat system heat-storage agent, and heats a portion of a first vapor of the supply medium, which is the vapor of the supply medium obtained by heating the supply medium in the heat-storage and heat-exchanger, using the thermal energy stored in the superheat system heat-storage agent to obtain a superheated vapor of the supply medium having a temperature higher than that of the first vapor,
   wherein the sunlight-condensing heat collector is configured to heat a heat medium using thermal energy obtained by condensing sunlight,
   the superheat system sunlight-condensing heat collector is configured to heat a superheat system heat medium using thermal energy obtained by condensing sunlight,
   the vapor supplier includes a vapor drum in which the supply medium is stored,
   the heat-storage and heat-exchanger includes a primary heat exchanger which is provided in the heat-storage agent storage tank, is connected to the sunlight-condensing heat collector, and guides the heat medium which has passed through the sunlight-condensing heat collector, and a secondary heat exchanger which is provided in the heat-storage agent storage tank, is connected to the vapor drum, and guides the supply medium,
   the superheat system heat-storage and heat-exchanger includes a superheat system primary heat exchanger which is provided in the superheat system heat-storage agent storage tank, is connected to the superheat system sunlight-condensing heat collector, and guides the superheat system heat medium which has passed through the superheat system sunlight-condensing heat collector, and a superheat system secondary heat exchanger which is provided in the superheat system heat-storage agent storage tank, is connected to the vapor drum, and guides the first vapor, and a first pipe which connects the vapor drum and the application destination and through which the first vapor passes, a second pipe which branches from the first pipe and is connected to the superheat system secondary heat exchanger and through which the first vapor passes, and a third pipe which connects the superheat system secondary heat exchanger and a second application destination and through which the superheated vapor passes are provided.

2. The vapor supply device according to claim 1, wherein the heat-storage and heat-exchanger heats the heat-storage agent by the heat medium which has been heated using the thermal energy.

3. The vapor supply device according to claim 1, wherein the sunlight-condensing heat collector includes a plurality of sunlight-condensing heat collectors;

the heat-storage and heat-exchanger includes a plurality of heat-storage and heat-exchangers;

each of the plurality of heat-storage and heat-exchangers heats a heat-storage agent stored therein using the thermal energy obtained in the corresponding sunlight-condensing heat collector and stores thermal energy in the heat-storage agent, and heats the supply medium using the thermal energy stored in the heat-storage agent; and the vapor supplier supplies vapors of the supply medium, which are respectively obtained by heating the supply medium in the plurality of heat-storage and heat-exchangers, under different conditions.

4. The vapor supply device according to claim 3, wherein by heating a portion of a first vapor of the supply medium, which is obtained by heating the supply medium in a first heat-storage and heat-exchange unit of the plurality of heat-storage and heat-exchange units, in a second heat-storage and heat-exchange unit of the plurality of heat-storage and heat-exchange units, a superheated vapor of the supply medium which has a temperature higher than that of the first vapor is obtained.

5. The vapor supply device according to claim 1, wherein the vapor supplier further includes an auxiliary boiler which heats the supply medium.

6. The vapor supply device according to claim 1, wherein the vapor of the supply medium is continuously supplied by heating the supply medium using the thermal energy stored in the heat-storage agent even in a time zone in which thermal energy from sunlight is not obtained.

7. A drying system comprising:
the vapor supply device according to claim 1; and
a fluidized bed-drying device which uses the vapor of the supply medium supplied from the vapor supply device as a heat source to dry a high-humidity raw material while flowing the high-humidity raw material.

8. A drying system comprising:
the vapor supply device according to claim 4; and
a fluidized bed-drying device which uses the vapor of the supply medium supplied from the vapor supply device as a heat source and dries a high-humidity raw material using the superheated vapor while flowing the high-humidity raw material.

* * * * *